(12) United States Patent
Oren

(10) Patent No.: US 6,795,541 B2
(45) Date of Patent: Sep. 21, 2004

(54) METHOD, APPARATUS AND SYSTEM FOR COMPLETING A CALL WHEN A CALLED PARTY HAS NOT ANSWERED THE CALL

(75) Inventor: David Oren, Melville, NY (US)

(73) Assignee: Ericsson Inc., Plano, TX (US)

( * ) Notice: Subject to any disclaimer, the term of this patent is extended or adjusted under 35 U.S.C. 154(b) by 223 days.

(21) Appl. No.: 10/094,687

(22) Filed: Mar. 11, 2002

(65) Prior Publication Data
US 2003/0169865 A1 Sep. 11, 2003

(51) Int. Cl.[7] .............................................. H04M 3/42
(52) U.S. Cl. .............. 379/207.08; 370/352; 379/88.11; 379/88.13; 379/88.17
(58) Field of Search ................................ 370/352, 353, 370/354; 379/88.01, 88.04, 88.11, 88.13, 88.16, 88.17, 88.18, 265.09, 215.01, 900, 207.08

(56) References Cited

U.S. PATENT DOCUMENTS

| | | | |
|---|---|---|---|
| 5,557,659 A | 9/1996 | Hyde-Thomson | |
| 5,751,791 A | 5/1998 | Chen et al. | |
| 5,884,032 A | * 3/1999 | Bateman et al. | ............ 709/204 |
| 6,069,890 A | 5/2000 | White et al. | |
| 6,069,940 A | 5/2000 | Carleton et al. | ......... 379/88.04 |
| 6,144,644 A | * 11/2000 | Bajzath et al. | ............... 370/259 |
| 6,233,318 B1 | 5/2001 | Picard et al. | ............. 379/88.17 |
| 6,263,064 B1 | * 7/2001 | O'Neal et al. | ......... 379/201.03 |
| 6,411,685 B1 | * 6/2002 | O'Neal | .................... 379/88.14 |
| 2001/0031633 A1 | 10/2001 | Tuomela et al. | |

FOREIGN PATENT DOCUMENTS

| | | | | |
|---|---|---|---|---|
| DE | 199 20 701 A1 | 5/1999 | | ............ H04M/1/64 |
| EP | 0 843 453 A2 | 5/1998 | | |
| EP | 0 913 982 A2 | 5/1999 | | |
| EP | 1 113 631 A2 | 7/2001 | | |
| EP | 1 139 677 A2 | 10/2001 | | |

* cited by examiner

Primary Examiner—Bing Q. Bui

(57) ABSTRACT

The present invention provides a method, apparatus and system of completing a call when a called party has not answered the call from a calling party. A signal indicating that the called party has not answered the call is detected (300) and the call is terminated (302). A message is presented to the calling party that indicates the called party has not answered the call and prompts the calling party to compose a multimedia message to be delivered to the called party (304). The multimedia message is then sent to a multimedia messaging service server (402) for subsequent delivery to the called party whenever the calling party completes composition of the multimedia message (308). This functionality can be implemented using a computer program embodied on a computer readable medium wherein each function is executed using a code segment.

39 Claims, 4 Drawing Sheets

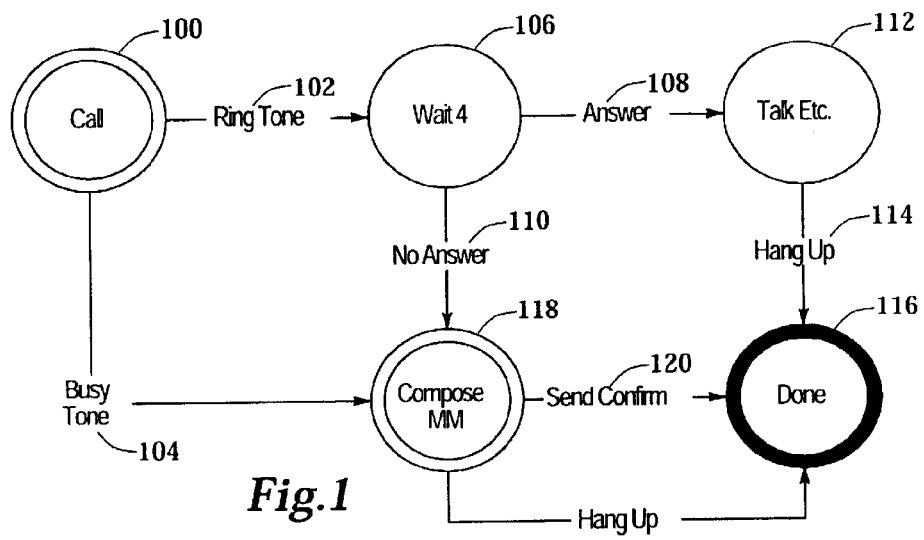
*Fig.1*
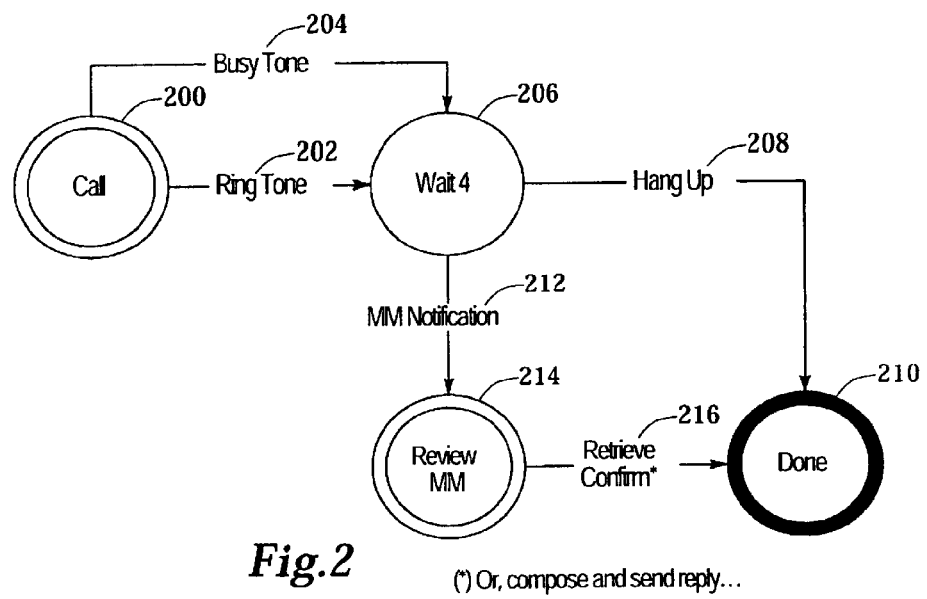
*Fig.2*  (*) Or, compose and send reply...

METHOD, APPARATUS AND SYSTEM FOR COMPLETING A CALL WHEN A CALLED PARTY HAS NOT ANSWERED THE CALL

TECHNICAL FIELD OF THE INVENTION

The present invention relates generally to the field of communications and, more particularly, to a method, apparatus and system for completing a call when a called party has not answered the call.

BACKGROUND OF THE INVENTION

In a mobile communications system, significant system resources are devoted to completing a call when the called party does not answer the call. For example, the mobile service center ("MSC") associated with the called party or the central switch office of the network provider is programmed to "forward" or "divert" unanswered calls to a voice mail or unified messaging intelligent peripheral. These unanswered calls can be characterized by the generation of an "announcement", "busy" or "no-answer" signal. The voice mail or unified messaging intelligent peripheral, which is a cumbersome, expensive and complex network component, then carries on a limited interaction with the calling party. The voice/unified mail intelligent peripheral completes the call by providing an announcement that the called party is unavailable and/or provides the calling party with the opportunity to leave a voice mail message for the called party. This online and timely content exchange is limited because message "composition" requires fairly complex interactions, such as "Press 1 to leave a voice message" and "Press 2 to leave a fax message."

In addition, this call completion process increases circuit switching within the network, reduces circuit quality and prolongs the duration or "air-time" of the connection (e.g., silence, hesitation, data rate, etc.). As a result, the network operator incurs increased operation and maintenance costs. In addition, the calling party and the called party are likely to incur additional expenses related to the prolonged "air-time" and the messaging service.

There is, therefore, a need for a method, apparatus and system for completing a call when a called party has not answered the call that eliminates or minimizes the previously described problems.

SUMMARY OF THE INVENTION

The present invention provides a flexible architecture that allows the calling party's terminal to complete a call that has not been answered by the called party. Note that the present invention completes an interaction between the parties, rather than just completing a voice call. The functionality provided by the present invention can be implemented solely on the calling party's terminal or split between the calling party's terminal and the called party's MSC. As a result, a network operator's central office may reallocate "circuit switching" and voice channels for other context, while reducing real-time voice interaction constraints within the network. In addition, messaging content generated by the present invention is transmitted in less expensive "data circuit" channels, such as the Internet.

For example, the present invention provides a method of completing a call when a called party has not answered the call from a calling party by detecting a signal indicating that the called party has not answered the call and terminating the call. A message is presented to the calling party that indicates the called party has not answered the call and prompts the calling party to compose a multimedia message to be delivered to the called party. The multimedia message is then sent to a multimedia messaging service server ("MMS Server") for subsequent delivery to the called party whenever the calling party completes composition of the multimedia message. As mentioned above, this method can implemented solely on the calling party's terminal or split between the calling party's terminal and the called party's MSC. Moreover, this method can be implemented using a computer program embodied on a computer readable medium wherein each function is executed using a code segment.

In addition, the present invention provides a terminal capable of completing a call when a called party has not answered the call from a calling party. The terminal includes means for detecting a signal indicating that the called party has not answered the call, terminating the call, and presenting a message to the calling party indicating that the called party has not answered the call and prompting the calling party to compose a multimedia message to be delivered to the called party. The terminal also includes means for sending the multimedia message to a MMS Server for subsequent delivery to the called party whenever the calling party completes composition of the multimedia message.

The present invention also provides a system for completing a call when a called party has not answered the call from a calling party that includes a MMS Server and a terminal operated by the calling party that is communicably coupled to the MMS Server. The terminal detects a signal indicating that the called party has not answered the call, terminates the call, and presents a message to the calling party indicating that the called party has not answered the call and prompts the calling party to compose a multimedia message to be delivered to the called party. The terminal then sends the multimedia message to the MMS Server for subsequent delivery to the called party whenever the calling party completes composition of the multimedia message.

Moreover, the present invention provides a system for completing a call when a called party has not answered the call from a calling party that includes a MSC associated with the called party, a MMS Server and a terminal operated by the calling party. In a first configuration, the MSC detects a signal indicating that the called party has not answered the call, terminates the call, and sends the signal to the terminal to invoke a message. In a second configuration, the MSC detects the signal indicating that the called party has not answered the call, terminates the call, and sends an invoke message to the MMS Server. Also in the second configuration, the MMS Server is communicably coupled to the MSC and sends a message to the terminal indicating that the called party has not answered the call in response to the invoke message. In both configurations, the terminal, which is communicably coupled to the MSC and the MMS Server, presents the message to the calling party and prompts the calling party to compose a multimedia message to be delivered to the called party. The terminal then sends the multimedia message to the MMS Server for subsequent delivery to the called party whenever the calling party completes composition of the multimedia message.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show byway of example how the same may be carried into effect, reference is now made to the detailed description of the invention along with the accompanying figures in which corresponding numerals in the different figures refer to corresponding parts and in which:

FIG. 1 is a diagram illustrating a "no answer" or "busy" call completion process in accordance with an embodiment of the present invention;

FIG. 2 is a diagram illustrating an "announcement" call completion process in accordance with an embodiment of the present invention;

DETAILED DESCRIPTION OF THE INVENTION

Figure 3:
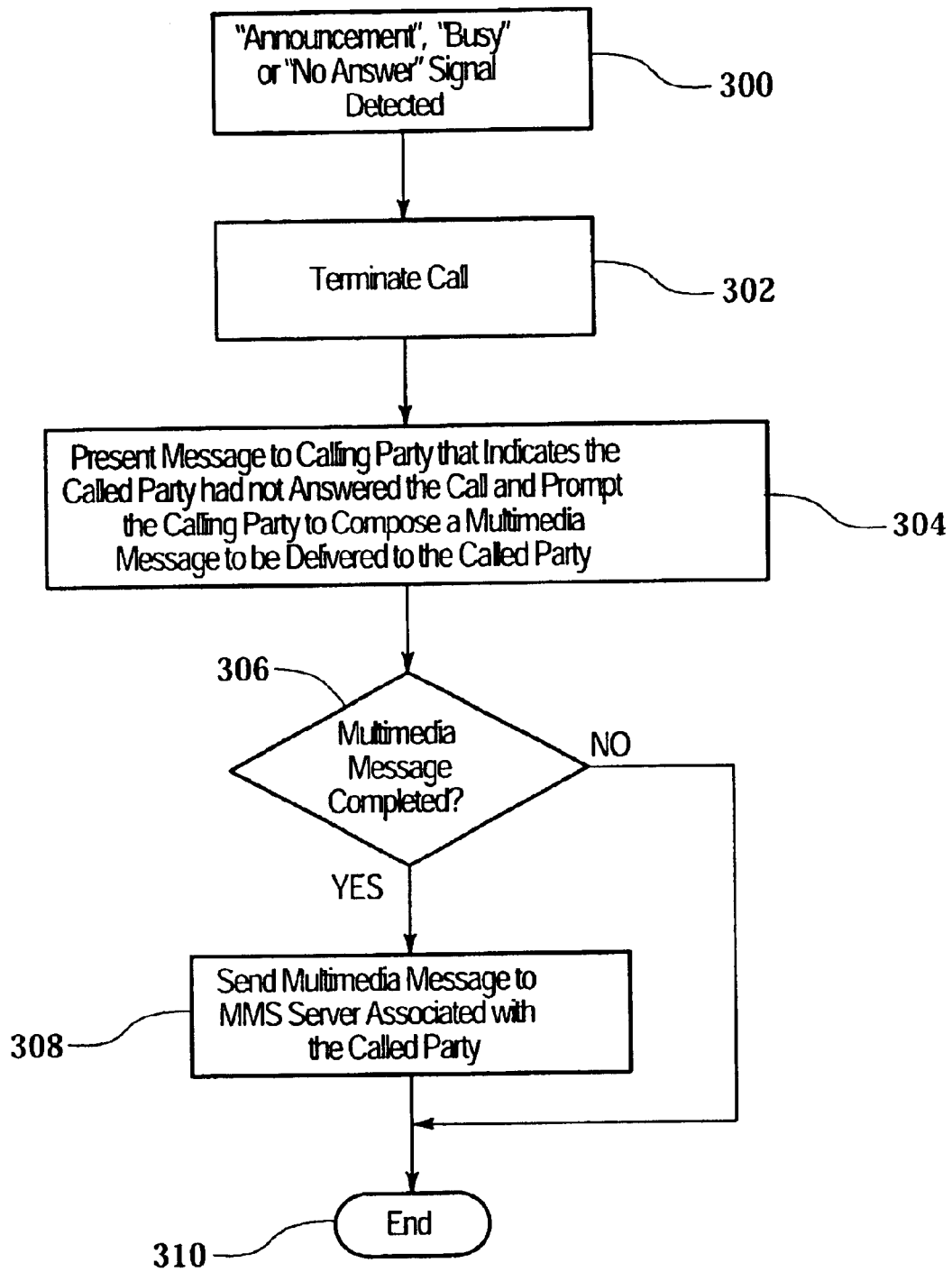
FIG. 3 is a flow chart illustrating a method of completing a call in accordance with the present invention.

While the making and using of various embodiments of the present invention are discussed in detail below, it should be appreciated that the present invention provides many applicable inventive concepts, which can be embodied in a wide variety of specific contexts. For example, in addition to telecommunications systems, the present invention may be applicable to other forms of communications or general data processing. Other forms of communications may include communications between networks, communications via satellite, or any form of communications not yet known to man as of the date of the present invention. The specific embodiments discussed herein are merely illustrative of specific ways to make and use the invention and do not limit the scope of the invention.

The present invention provides a flexible architecture that allows the calling party's terminal to complete a call that has not been answered by the called party. Note that the present invention completes an interaction between the parties, rather than just completing a voice call. The functionality provided by the present invention can be implemented solely on the calling party's terminal or split between the calling party's terminal and the called party's MSC. As a result, a network operator's central office may reallocate "circuit switching" and voice channels for other context, while reducing real-time voice interaction constraints within the network. In addition, messaging content generated by the present invention is transmitted in less expensive "data circuit" channels, such as the Internet.

The present invention operates within a multimedia messaging service environment ("MMSE"), which may comprise fixed networks, mobile networks, Global System for Mobile Communications ("GSM") second generation ("2G") mobile networks, 3G mobile networks and Internet/IP networks. The MMSE provides users with the ability to view, compose and handle multimedia messages (e.g., submitting, receiving, deleting of multimedia messages) through an efficient packet-data bearer. Multimedia messages consist of one or more media elements, such as text, voice, image and video, and it is the combination of these media elements in an ordered synchronized manner that creates a multimedia presentation, which is also referred to as multimedia content. The MMSE provides all the necessary service elements, e.g. delivery, storage and notification functionality. These service elements may be located within one network or distributed across several networks or network types. The MMSE includes one or more multimedia messaging centers ("MMC"), which include at least a MMS Server a message storage device. The MMC is responsible for storage and handling of incoming and outgoing messages and for the transfer of messages between different messaging systems.

Referring to FIG. 1, a diagram illustrating a "no answer" or "busy" call completion process in accordance with an embodiment of the present invention is shown. A calling party initiates a call using a terminal as indicated by state 100. The terminal can be a handheld device or handset, such as a personal data assistant ("PDA"), mobile phone or combination thereof, which has multimedia capability. The terminal or other network element senses a ring tone 102 or a busy tone 104. A ring tone 102 will place the terminal or network element in a wait state 106. Thereafter, the terminal or network element will sense an answer 108 or a no answer 110. If the called party answers 108 the call, the call is completed and the parties "talk" as indicated by state 112. When one of the parties "hangs up" 114, the call is terminated and the process is done as indicated by state 116.

On the other hand, a busy tone 104 or a no answer 110 will terminate the call and place the terminal or network element in a message state 118. In the message state 118, the calling party is given the opportunity to compose a multimedia message that will be delivered to the called party. A multimedia message as observed by a called or calling party is a combination of one or more different media elements in a multimedia presentation that can be transferred between the parties without having to be transferred in real time. If the calling party completes the multimedia message, the multimedia message is sent 120 and a confirmation that the appropriate network element received the multimedia message is received, which will complete the process 116. If, however, the calling party does not complete the multimedia message or "hangs up", the process is also terminated 116.

Now referring to FIG. 2, a diagram illustrating an "announcement" call completion process in accordance with an embodiment of the present invention is shown. In this case, the called party has selected an announcement, which is a default message or composed a pre-canned multimedia message (e.g., I'm traveling over here . . . picture), to be delivered to a calling party on a no-answer signal. The announcement may provide information and/or an optional redirection address for the reply (e.g., "e-mail, "follow me", etc.). When the called party's terminal is unreachable, a network element triggers delivery of the announcement to the calling party. The announcement may offer to have a multimedia message reply or just state some fact.

A calling party initiates a call using a terminal as indicated by state 200. The terminal or other network element senses a ring tone 202 or a busy tone 204, either of which will place the terminal or network element in a wait state 206. If the calling party "hangs up" 208 before the announcement is triggered the call is terminated and the process is done as indicated by state 210. If, however, the announcement is triggered 212 (MM notification), the terminal or network element presents the announcement to the calling party as indicated by state 214. Once the announcement is presented, a confirmation that the terminal received the multimedia message is sent 216 and the process is terminated 210. The calling party may be given the opportunity to compose a multimedia message that will be delivered to the called party 218 as a reply to the retrieved announcement. If the calling party completes the multimedia message, the multimedia message is sent and a confirmation that the appropriate network element received the multimedia message is received, which will complete the process 210. If, however, the calling party does not complete the multimedia message or "hangs up", the process is also terminated 210.

Referring now to FIG. 3, a flow chart illustrating a method of completing a call in accordance with the present invention is shown. The process begins with a signal indicating that the called party has not answered the call is detected in block 300. The signal can be an "announcement" signal, a "busy" signal, a "no answer" signal or any other similar signal. The signal can be generated by a network element, such as the MSC associated with the called party, or by the terminal operated by the calling party. The call is then terminated in block 302 by the appropriate device (MSC or terminal). Thereafter, a message is presented to the calling party indicating that the called party has not answered the call and prompting the calling party to compose a multimedia message to be delivered to the called party in block 304. The message can be: (1) generated by the terminal in response to the signal, which is generated by the terminal or by the MSC associated with the called party, or (2) received from a MMS Server as a result of an invoke message from the MSC associated with the called party. In addition, the message can be a default message or a customized message as determined by the calling party (a terminal preference), the called party (the announcement) or a network element (MMS Server or MSC associated with the called party). The message may contain one or more multimedia elements.

If the calling party completes composition of the multimedia message, as determined in decision block 306, the multimedia message is sent to a MMS Server for subsequent delivery to the called party in block 308 and the process ends in block 310. The MMS Server stores the multimedia message if the MMS Server is also associated with the called party, or it forwards the multimedia message to the MMS Server associated with the called party for storage. The appropriate MMS Server sends a notification to the called party that the multimedia message has been received and is ready for delivery. As previously mentioned, the multimedia message may include text, pictures and audio files. The MMS Server may also send a confirmation to the terminal indicating successful receipt of the multimedia message. Alternatively, the multimedia message may be sent to another destination, such as an e-mail address. In addition, the multimedia message may be set for deferred delivery on a later schedule, which may be selected by the network operator (e.g., low cost, low priority, quality of service parameters, service plan, etc.), by the called party (e.g., "I'll be back from my honeymoon on . . . ", etc.) or by the calling party (e.g., a "birthday card", etc.). Likewise, the multimedia message may be set for expedited or "rush" delivery on an earlier schedule. If, however, the calling party does not complete composition of the multimedia message or "hangs up", as determined in decision block 306, the process ends in block 310.

Figure 4:
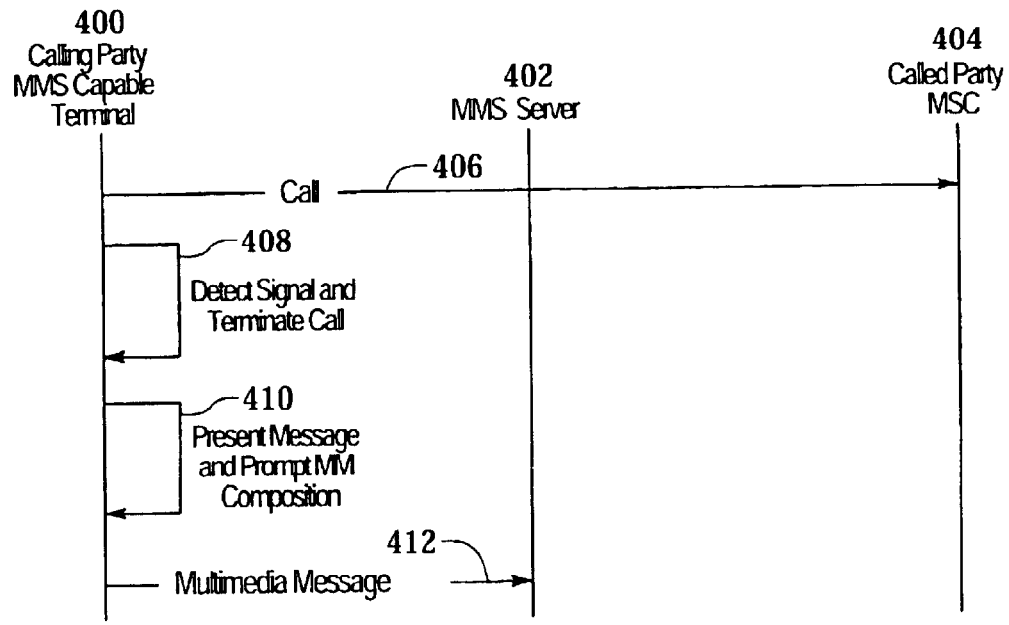
FIG. 4 is a sequence diagram illustrating a call completion process in accordance with one embodiment of the present invention.

Now referring to FIG. 4, a sequence diagram illustrating a call completion process in accordance with one embodiment of the present invention is shown. This sequence represents a system that includes a terminal 400, a MMS Server 402 and a MSC 404, all of which are communicably coupled to one another as indicated by the message flows illustrated. The terminal 400, which is multimedia service capable and operated by the calling party, initiates a call 406 to the called party. The call 406 is directed though the communications network to a MSC 404 associated with the called party. The terminal 400 detects a signal indicating that the called party has not answered the call and terminates the call 406 in process step 408. The signal can be an "announcement" signal, a "busy" signal, a "no answer" signal or any other similar signal. The terminal 400 then presents a message to the calling party indicating that the called party has not answered the call and prompts the calling party to compose a multimedia message to be delivered to the called party in process step 410. The message is generated by the terminal 400 in response to the signal, which is also generated by the terminal 400. In addition, the message can be a default message or a customized message as determined by the calling party (a terminal 400 preference). The message may contain one or more multimedia elements.

If the calling party completes composition of the multimedia message in process 410, the multimedia message 412 is sent to a MMS Server 402 for subsequent delivery to the called party. The MMS Server 402 stores the multimedia message 412 if the MMS Server 402 is also associated with the called party, or it forwards the multimedia message 412 to a MMS Server associated with the called party for storage. The appropriate MMS Server 402 sends a notification to the called party that the multimedia message 412 has been received and is ready for delivery. As previously mentioned, the multimedia message 412 may include text, pictures and audio files. The MMS Server 402 may also send a confirmation to the terminal 400 indicating successful receipt of the multimedia message 412. In addition, the multimedia message may be set for deferred delivery on a later schedule, which may be selected by the network operator (e.g., low cost, low priority, quality of service parameters, service plan, etc.), by the called party (e.g., "I'll be back from my honeymoon on . . . ", etc.) or by the calling party (e.g., a "birthday card", etc.). Likewise, the multimedia message may be set for expedited or "rush" delivery on an earlier schedule. If, however, the calling party does not complete composition of the multimedia message in process 410 or "hangs up" the process ends. Note that the means for implementing the process described above within the terminal 400 may be accomplished via hardware, software, or a combination thereof.

Figure 5:
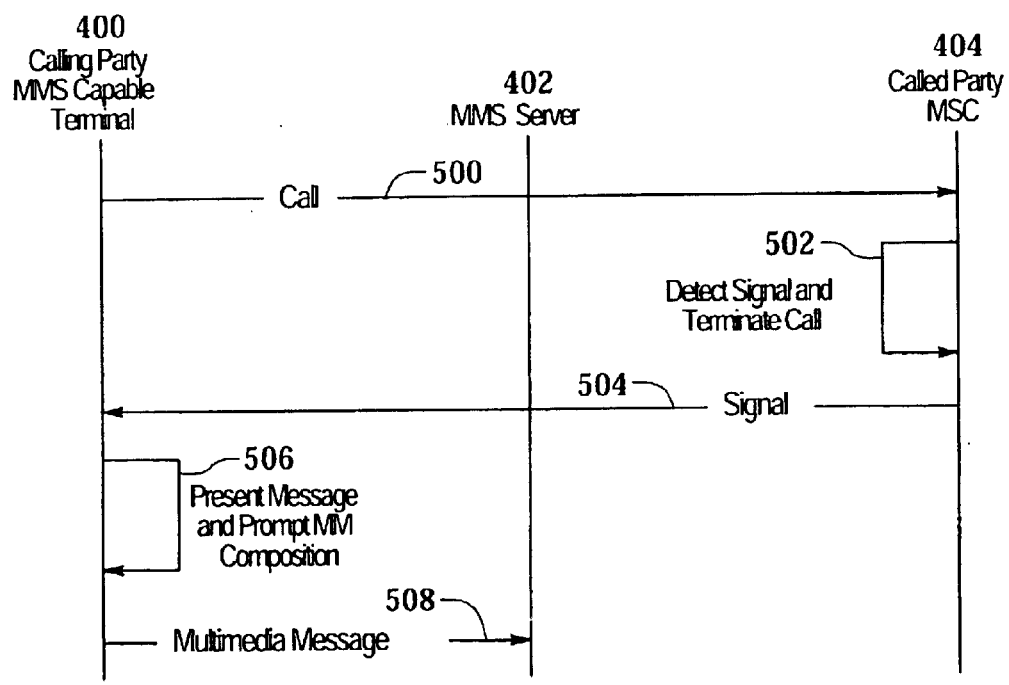
FIG. 5 is a sequence diagram illustrating a call completion process in accordance with another embodiment of the present invention.

Referring now to FIG. 5, a sequence diagram illustrating a call completion process in accordance with another embodiment of the present invention is shown. This sequence represents a system that includes a terminal 400, a MMS Server 402 and a MSC 404, all of which are communicably coupled to one another as indicated by the message flows illustrated. The terminal 400, which is multimedia service capable and operated by the calling party, initiates a call 500 to the called party. The call 500 is directed though the communications network to a MSC 404 associated with the called party. The MSC 404 detects a signal indicating that the called party has not answered the call and terminates the call 500 in process step 502. The signal can be an "announcement" signal, a "busy" signal, a "no answer" signal or any other similar signal. The MSC 404 then sends the signal 504 to the terminal 400. The terminal 400 then presents a message to the calling party indicating that the called party has not answered the call in response to the signal 504 and prompts the calling party to compose a multimedia message to be delivered to the called party in process step 506 The message is generated by the terminal 400 in response to the signal. In addition, the message can be a default message or a customized message as determined by the calling party (a terminal 400 preference). The message may contain one or more multimedia elements.

If the calling party completes composition of the multimedia message in process step 506, the multimedia message 508 is sent to a MMS Server 402 for subsequent delivery to the called party. The MMS Server 402 stores the multimedia message 508 if the MMS Server 402 is also associated with the called party, or it forwards the multimedia message 508 to a MMS Server associated with the called party for storage. The appropriate MMS Server 402 sends a notification to the called party that the multimedia message 508 has been received and is ready for delivery. As previously mentioned, the multimedia message 508 may include text, pictures and audio files. The MMS Server 402 may also send a confirmation to the terminal 400 indicating successful receipt of the multimedia message 508. Alternatively, the multimedia message 508 may be sent to another destination, such as an e-mail address. In addition, the multimedia message may be set for deferred delivery on a later schedule, which may be selected by the network operator (e.g., low cost, low priority, quality of service parameters, service plan, etc.), by the called party (e.g., "I'll be back from my honeymoon on . . . ", etc.) or by the calling party (e.g., a "birthday card", etc.). Likewise, the multimedia message may be set for expedited or "rush" delivery on an earlier schedule. If, however, the calling party does not complete composition of the multimedia message in process step 506 or "hangs up" the process ends.

Figure 6:
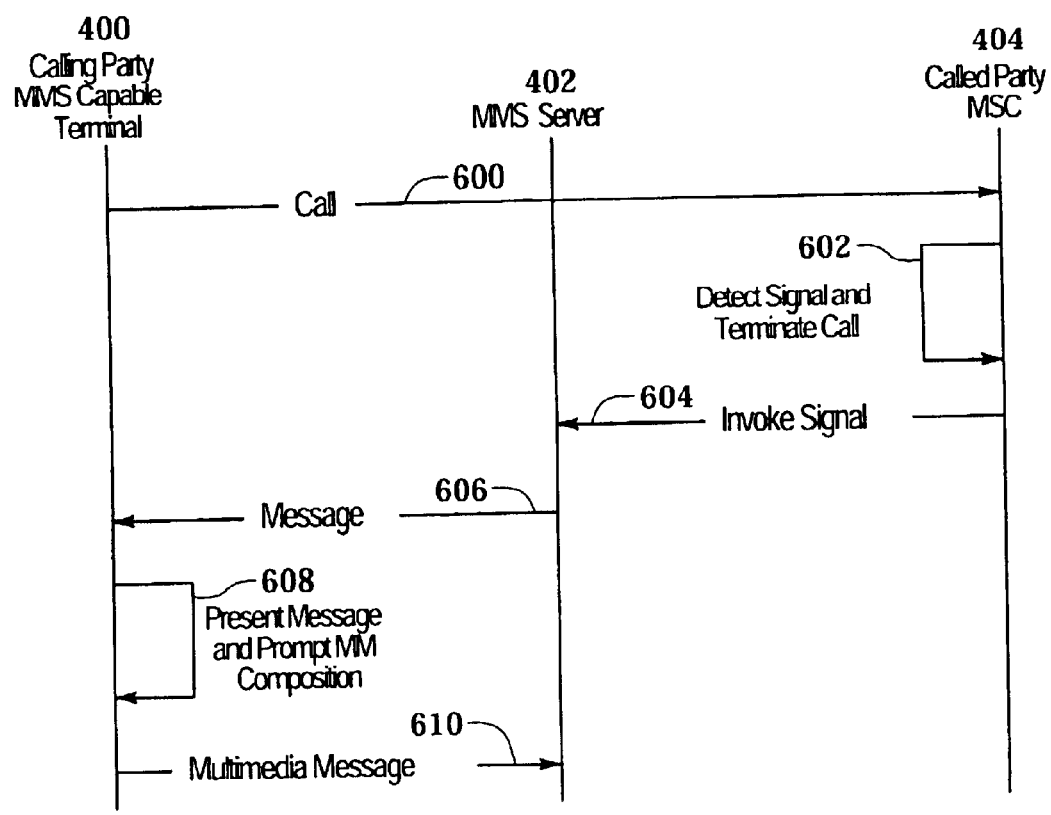
FIG. 6 is a sequence diagram illustrating a call completion process in accordance with another embodiment of the present invention.

Now referring to FIG. 6, a sequence diagram illustrating a call completion process in accordance with another embodiment of the present invention is shown. This sequence represents a system that includes a terminal 400, a MMS Server 402 and a MSC 404, all of which are communicably coupled to one another as indicated by the message flows illustrated. The terminal 400, which is multimedia service capable and operated by the calling party, initiates a call 600 to the called party. The call 600 is directed though the communications network to a MSC 404 associated with the called party. The MSC 404 detects a signal indicating that the called party has not answered the call and terminates the call 600 in process step 602. The signal can be an "announcement" signal, a "busy" signal, a "no answer" signal or any other similar signal. The MSC 404 then sends an invoke message 604 to the MMS Server 402. The MMS Server 402 sends a message 606 indicating that the called party has not answered the call to the terminal 400 in response to the invoke message. The message can be a default message or a customized message as determined by the called party (the announcement) or a network element (MMS Server 402 or MSC 404 associated with the called party). The message may contain one or more multimedia elements. The terminal 400 then presents the message 606 to the calling party and prompts the calling party to compose a multimedia message to be delivered to the called party in process step 608.

If the calling party completes composition of the multimedia message in process step 608, the multimedia message 610 is sent to a MMS Server 402 for subsequent delivery to the called party. The MMS Server 402 stores the multimedia message 610 if the MMS Server 402 is also associated with the called party, or it forwards the multimedia message 610 to a MMS Server associated with the called party for storage. The appropriate MMS Server 402 sends a notification to the called party that the multimedia message 610 has been received and is ready for delivery. As previously mentioned, the multimedia message 610 may include text, pictures and audio files. The MMS Server 402 may also send a confirmation to the terminal 400 indicating successful receipt of the multimedia message 610. Alternatively, the multimedia message 610 may be sent to another destination, such as a redirection address provided in the message 606 for the reply (e.g., "e-mail", "follow me", etc.). In addition, the multimedia message may be set for deferred delivery on a later schedule, which may be selected by the network operator (e.g., low cost, low priority, quality of service parameters, service plan, etc.), by the called party (e.g., "I'll be back from my honeymoon on . . . ", etc.) or by the calling party (e.g., a "birthday card", etc.). Likewise, the multimedia message may be set for expedited or "rush" delivery on an earlier schedule. If, however, the calling party does not complete composition of the multimedia message in process step 608 or "hangs up" the process ends.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method of completing a call when a called party has not answered the call from a calling party comprising the steps of:

initiating a call towards the called party over a voice channel;

detecting a signal indicating that the called party has not answered the call;

terminating the call over said voice channel;

presenting a message to the calling party indicating that the called party has not answered the call and prompting the calling party to compose a multimedia message to be delivered to the called party; and sending the multimedia message over a data channel to a multimedia messaging service server for subsequent delivery to the called party whenever the calling party completes composition of the multimedia message.

2. The method as recited in claim 1, wherein the signal indicating that the called party has not answered the call comprises a busy signal.

3. The method as recited in claim 1, wherein the message is a customized message determined by the called party.

4. The method as recited in claim 1, wherein the message is delivered to an alternative destination associated with said called party.

5. The method as recited in claim 1, wherein a terminal operated by the calling party performs the detection, termination, presentation, prompting and sending steps.

6. The method as recited in claim 1, wherein a mobile switching center associated with the called party performs the step of detecting the signal indicating that the called party has not answered the call, performs the step of terminating the call, and sends the signal to the terminal operated by the calling party to invoke the message.

7. The method as recited in claim 1, wherein a mobile switching center associated with the called party performs the step of detecting the signal indicating that the called party has not answered the call, performs the step of terminating the call, and sends an invoke message to the multimedia messaging service server instructing the multimedia messaging service server to send the message to the calling party.

8. The method as recited in claim 1, wherein the multimedia messaging service server is associated with the calling party and the multimedia messaging service server forwards the multimedia message to a multimedia messaging service server associated with the called party for subsequent delivery to the called party.

9. The method as recited in claim 1, wherein the multimedia messaging service server is associated with the called party.

10. The method as recited in claim 1, further comprising the step of deferring delivery of the multimedia message to the called party.

11. A computer program embodied on a computer-readable medium for completing a call when a called party has not answered the call from a calling party comprising:
a code segment adapted to initiate a call towards the called party over a voice channel;
a code segment adapted to detect a signal indicating that the called party has not answered the call;
a code segment adapted to terminate the call over said voice channel;
a code segment adapted to present a message to the calling party indicating that the called party has not answered the call and prompt the calling party to compose a multimedia message to be delivered to the called party: and
a code segment adapted to send the multimedia message over a data channel to a multimedia messaging service server for subsequent delivery to the called party whenever the calling party completes composition of the multimedia message.

12. The computer program as recited in claim 11, wherein the signal indicating that the called party has not answered the call comprises a busy signal.

13. The computer program as recited in claim 11, wherein the message is a customized message determined by the called party.

14. The computer program as recited in claim 11, wherein the message comprises an alternative destination address associated with the called Party.

15. The computer program as recited in claim 11, wherein the code segments adapted to perform the detection termination, presentation, prompting and sending functions are to reside on a terminal operated by the calling party.

16. The computer program as recited in claim 11, further comprising:
a code segment that is to reside on a mobile switching center associated with the called party and is adapted to send the signal to a terminal operated by the calling party to invoke the message; and
wherein the code segments adapted to perform the detection and termination functions are to reside on the mobile switching center.

17. The computer program as recited in claim 11, further comprising:
a code segment that is to reside on a mobile switching center associated with the called party and is adapted to send an invoke message to the multimedia messaging service server instructing the multimedia messaging service server to send the message to the calling party; and
wherein the code segments adapted to perform the detection and termination functions are to reside on the mobile switching center.

18. The computer program as recited in claim 11, wherein the multimedia messaging service server is associated with the calling party and the multimedia messaging service server forwards the multimedia message to a multimedia messaging service server associated with the called party for subsequent delivery to the called party.

19. The computer program as recited in claim 11, wherein the multimedia messaging service server is associated with the called party.

20. The computer program as recited in claim 11, further comprising a code segment adapted to defer delivery of the multimedia message to the called party.

21. A terminal capable of completing a call when a called party has not answered the cell from a calling party comprising:
means for initiating a call towards the called party over a voice channel;
means for detecting a signal indicating that the called party has not answered the call;
means for terminating the call over said voice channel;
means for presenting a message to the calling party indicating that the called party has not answered the call and prompting the calling party to compose a multimedia message to be delivered to the called party; and
means for sending the multimedia message over a data channel to a multimedia messaging service server for subsequent delivery to the called party whenever the calling party completes composition of the multimedia message.

22. The terminal as recited in claim 21, wherein the signal indicating that the called party has not answered the call comprises a busy signal.

23. The terminal as recited in claim 21, wherein the message is a customized message.

24. The terminal as recited in claim 21, wherein the message is scheduled to be delivered at a specified time.

25. A system for completing a cell when a called party has not answered the call from a calling party comprising:
a multimedia messaging service server; and
a terminal operated by the calling party that is communicably coupled to the multimedia messaging service server, wherein the terminal initiates a call over a voice channel to said called party, detects a signal indicating that the called party has not answered the call, terminates the call over said voice channel, presents a message to the calling party indicating that the called party has not answered the call and prompts the calling party to compose a multimedia message to be delivered to the called party, and sends the multimedia message over a data channel to the multimedia messaging service server for subsequent delivery to the called party whenever the calling party completes composition of the multimedia message.

26. The system as recited in claim 25, wherein the signal indicating that the called party has not answered the call comprises a busy signal.

27. The system as recited in claim 25, wherein the multimedia messaging service server is associated with the calling party and the multimedia messaging service server forwards the multi media message to a multimedia messaging service server associated with the called party for subsequent delivery to the called party.

28. The system as recited in claim 25, wherein the multimedia messaging service server is associated with the called party.

29. The system as recited in claim 25, wherein the multimedia messaging service server defers delivery of the multimedia message to the called party.

30. A system for completing a call when a called party has not answered the call from a calling party comprising:

a mobile switching center associated with the called party that detects a signal indicating that the called party has not answered the call, terminates the call wherein said call has been established over a voice channel with a terminal operated by said calling party, and sends the signal to a said terminal operated by the calling party to invoke a message;

a multimedia messaging service server; and the terminal communicably coupled to the mobile switching center and the multimedia messaging service server, wherein the terminal presents the message to the calling party and prompts the calling party to compose a multimedia message to be delivered to the called party, and sends the multimedia message over a data channel to the multimedia messaging service server for subsequent delivery to the called party whenever the calling party completes composition of the multimedia message.

31. The system as recited in claim 30, wherein the signal indicating that the called party has not answered the call comprises a busy signal.

32. The system as recited in claim 30, wherein the multimedia messaging service server is associated with the calling party and the multimedia messaging service server forwards the multimedia message to a multimedia messaging service server associated with the called party for subsequent delivery to the called party.

33. The system as recited in claim 30, wherein the multimedia messaging service server is associated with the called party.

34. The system as recited in claim 30, wherein the multimedia messaging service server defers delivery of the multimedia message to the called party.

35. A system for completing a call when a called party has not answered the call from a calling party comprising:

a mobile switching center associated with the called party that detects a signal indicating that the called party has not answered the call, terminates the call wherein said call has been established with a terminal operated by said calling party over a voice channel, and sends an invoke message to the multimedia messaging service server;

a multimedia messaging service server communicably coupled to the mobile switching center, wherein the multimedia messaging service server sends a message to said terminal operated by the calling party indicating that the called party has not answered the call in response to the invoke message; and the terminal communicably coupled to the mobile switching center end the multimedia messaging service server, wherein the terminal presents the message to the calling party and prompts the calling party to compose a multimedia message to be delivered to the called party, and sends the multimedia message over a data channel to the multimedia messaging service server for subsequent delivery to the called party whenever the calling party completes composition of the multimedia message.

36. The system as recited in claim 35, wherein the signal indicating that the called party has not answered the call comprises a busy signal.

37. The system as recited in claim 35, wherein the multimedia messaging service server is associated with the calling party and the multimedia messaging service server forwards the multimedia message to a multimedia messaging service server associated with the called party for subsequent delivery to the called party.

38. The system as recited in claim 35, wherein the multimedia messaging service server is associated with the called party.

39. The system as recited in claim 35, wherein the multimedia messaging service server defers delivery of the multimedia message to the called party.

* * * * *